(12) United States Patent
Nirei (10) Patent No.: US 8,840,260 B2
(45) Date of Patent: Sep. 23, 2014

(54) INSTRUMENT ILLUMINATION DEVICE

(75) Inventor: Tsuyoshi Nirei, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 90 days.

(21) Appl. No.: 13/484,523

(22) Filed: May 31, 2012

(65) Prior Publication Data

US 2013/0010452 A1    Jan. 10, 2013

(30) Foreign Application Priority Data

Jul. 6, 2011 (JP) ................. 2011-149740

(51) Int. Cl.
*G01D 11/28* (2006.01)
(52) U.S. Cl.
CPC ..................... *G01D 11/28* (2013.01)
USPC ............. 362/23.07; 362/23.12; 362/23.19; 362/23.21
(58) Field of Classification Search
CPC ...................................... G01D 11/28
USPC ........................... 362/23.01–23.22
See application file for complete search history.

(56) References Cited

U.S. PATENT DOCUMENTS

| 8,128,248 B2 * | 3/2012 | Feit ................ 362/23 |
| 2009/0223436 A1 | 9/2009 | Werman et al. |
| 2009/0316382 A1 | 12/2009 | Birman et al. |

FOREIGN PATENT DOCUMENTS

| EP | 2 015 126 A1 | 1/2009 |
| GB | 2 472 078 A | 1/2011 |
| JP | 2005037265 A | 2/2005 |
| JP | 2009210572 A | 9/2009 |
| JP | 2010139296 A | 6/2010 |

OTHER PUBLICATIONS

European Search Report, Application No. 12 16 9978, dated Oct. 24, 2012, The Hague.
Office Action dated Mar. 11, 2014 issued by the Japanese Patent Office.

* cited by examiner

*Primary Examiner* — Diane Lee
*Assistant Examiner* — James Cranson, Jr.
(74) *Attorney, Agent, or Firm* — Shimokaji & Assoc., P.C.

(57) ABSTRACT

Disclosed is an instrument illumination device enabling homogeneous illumination light in a broad area, without increasing the number of light sources, and thereby enhancing the freedom degree of the ornamental designing process. An instrument housing includes a bottom face having LEDs disposed thereon and an illumination area including a main illumination area having a main dial for displaying a revolution on the dial plate covering a front opening and an auxiliary illumination area having an auxiliary dial for displaying water temperature. The main illumination area is in the shape of a ring having a cut-out at a lower part thereof, and the auxiliary illumination area fills the cut-out connecting the main illumination area. Illumination light from the LEDs illuminates an entire face of the illumination area in the ring shape from a rear side thereof as backlight.

1 Claim, 9 Drawing Sheets

INSTRUMENT ILLUMINATION DEVICE

TECHNICAL FIELD

The present invention relates to an instrument illumination device for a vehicle, and more specifically, to an instrument illumination device enabling homogeneous illumination to an instrument face regardless of directionality and the number of light sources.

BACKGROUND

Figure 8:
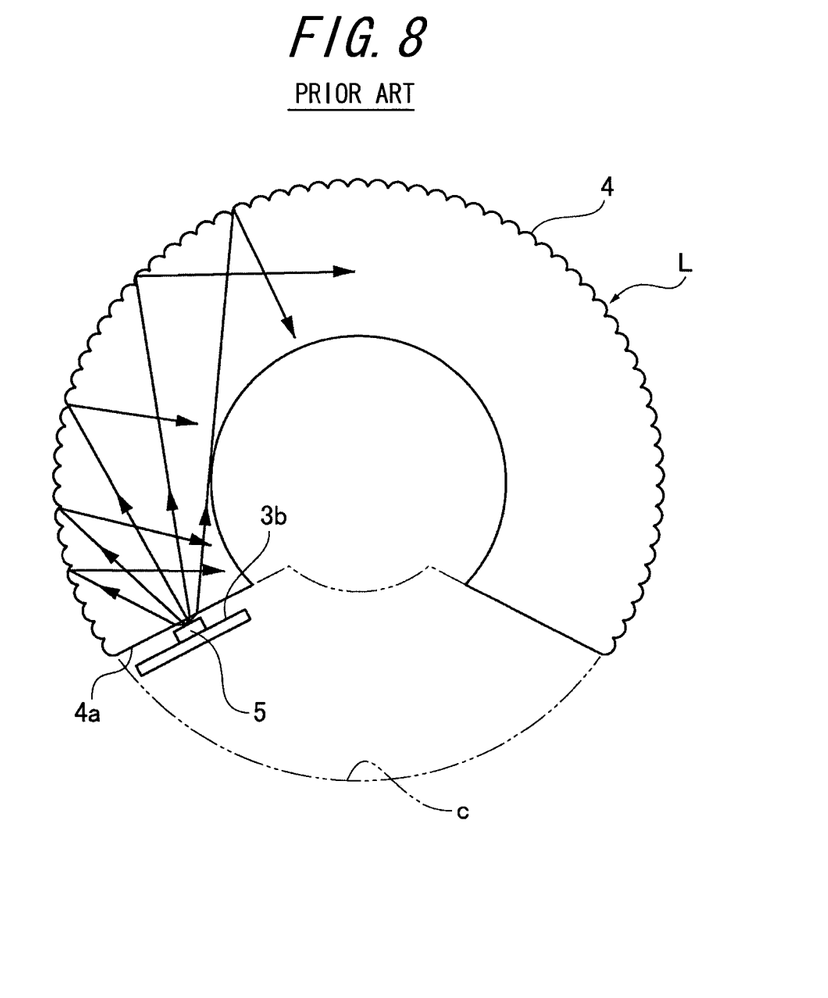
FIG. 8 is an elevation view illustrating the positional relationship between the light guide plate and the light source of one example of the conventional instrument illumination device.

An instrument illumination device for a vehicle, such as that as illustrated in FIG. 8, has been known (see, for example, Japanese Patent Application Laid-Open Publication No. 2010-139296).

Figure 9:
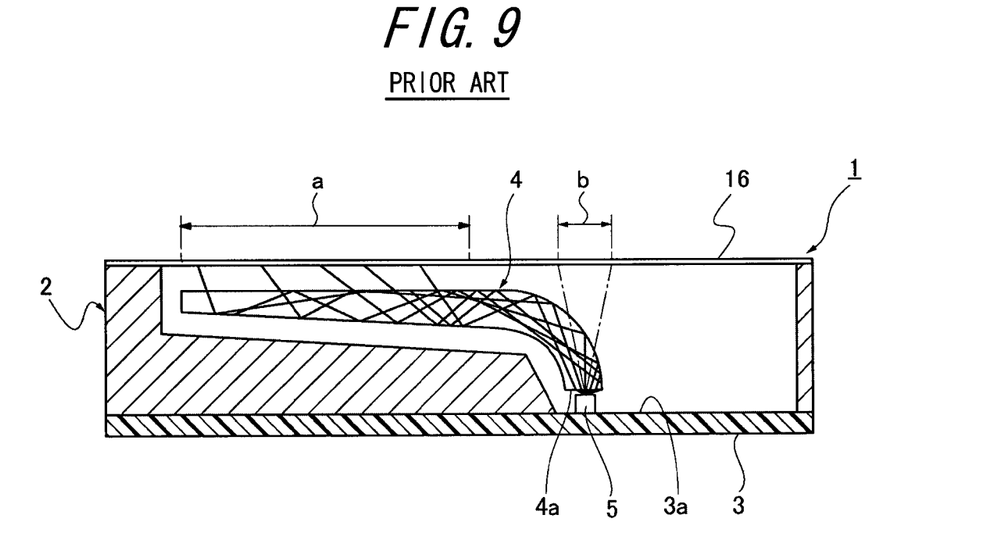
FIG. 9 is a longitudinal-sectional view illustrating the positional relationship between the light guide plate and the light source of another example of the conventional instrument illumination device.

This type of instrument illumination device is provided, inside a housing 2 of a vehicle instrument device 1, with a circuit board 3 that is made of synthetic resin as illustrated in FIG. 9.

To an inner face 3a of the circuit board 3, a small substrate 3b in the form of a small piece is fixedly attached opposite to an end face 4a of a light guide plate 4 of an arcuate shape, as illustrated in FIG. 8.

The small substrate 3b has an LED 5 mounted thereon for serving as a light source of the illumination light to enter the light guide plate 4. When the LED 5 is activated, the illumination light substantially entirely enters the end faces 4a of the light guide plate 4.

The function of such a conventional instrument illumination device will be described below.

In the conventional instrument illumination device configured as described above, as illustrated in FIG. 8 or FIG. 9, the illumination light from the LED 5 having entered the end face 4a of the light guide plate 4 is reflected within the light guide plate 4 and dispersed along a circumferential direction to illuminate a dial plate 16 from a rear side thereof in a main illumination area "a" illustrated in FIG. 9.

On this occasion, having high directionality, the illumination light of the LED 5 substantially entirely enters the light guide plate 4 from the end faces 4a and thereby an area "b" of the dial plate 16 immediately above the LED 5 is illuminated by a backlight.

However, in such a conventional instrument illumination device, depending upon the ornamental design of the dial plate, there may be an instance wherein not only the area "b" immediately above the LED 5, but also other area, such as an auxiliary illumination area "c" of an auxiliary instrument, for example, requires homogeneous illumination light as is the case with the main illumination area 1.

SUMMARY OF THE INVENTION

Accordingly, it is an object of the present invention to provide an instrument illumination device that enables homogeneous illumination light in a broad area, without increasing the number of light sources, and thereby enhancing the freedom degree of the ornamental designing process.

In order to achieve the above object, an instrument illumination device according to the present invention includes a light source disposed in an instrument housing, a dial plate that covers the instrument housing and uses illumination light from the light source as a backlight, and a light guide plate disposed between the light source and the dial plate, and is provided with a main illumination area using the backlight transmitted through the light guide plate for a main display of the dial plate and an auxiliary illumination area that is not opposite to the light guide plate, wherein the instrument illumination further comprises means for splitting the illumination light from the light source into a light amount for travelling inside the light guide plate and another light amount to be externally dispersed, in accordance with an area ratio of the main illumination area and the auxiliary illumination area.

With the instrument illumination device according to the present invention, the illumination light from the light source is split into two homogeneous light amounts: i.e., the light amount for travelling through the light guide plate and the light amount to be dispersed outside the light guide plate, in accordance with the area ratio of the main illumination area and the auxiliary illumination area.

Thus, the instrument illumination device according to the present invention o enables homogeneous illumination light broadly in both of the main illumination area and the auxiliary illumination area without increasing the number of light sources, and thereby enhancing the freedom degree of the ornamental designing process.

DESCRIPTION OF THE PREFERRED EMBODIMENTS

The instrument illumination device according to the preferred embodiments of the present invention will be described below with reference to the accompanying drawings.

It is noted that components with the same or similar structure and/or function as those of the conventional instrument illumination device as described above are denoted by the corresponding reference numerals.

First Embodiment

FIG. 1 to FIG. 6 illustrate the instrument illumination device for a vehicle according to the preferred embodiments.

The configuration of the instrument illumination device according to the first embodiment will be described first of all. In the present embodiment, an instrument panel is to be located in front of a driver's seat inside a vehicle, wherein an instrument illumination device 10 is provided for illuminating an indicator that indicates the vehicle speed or the engine revolution on a dial 8 of a dial plate 16 by an angular position of a rotary needle 9.

Figure 1:
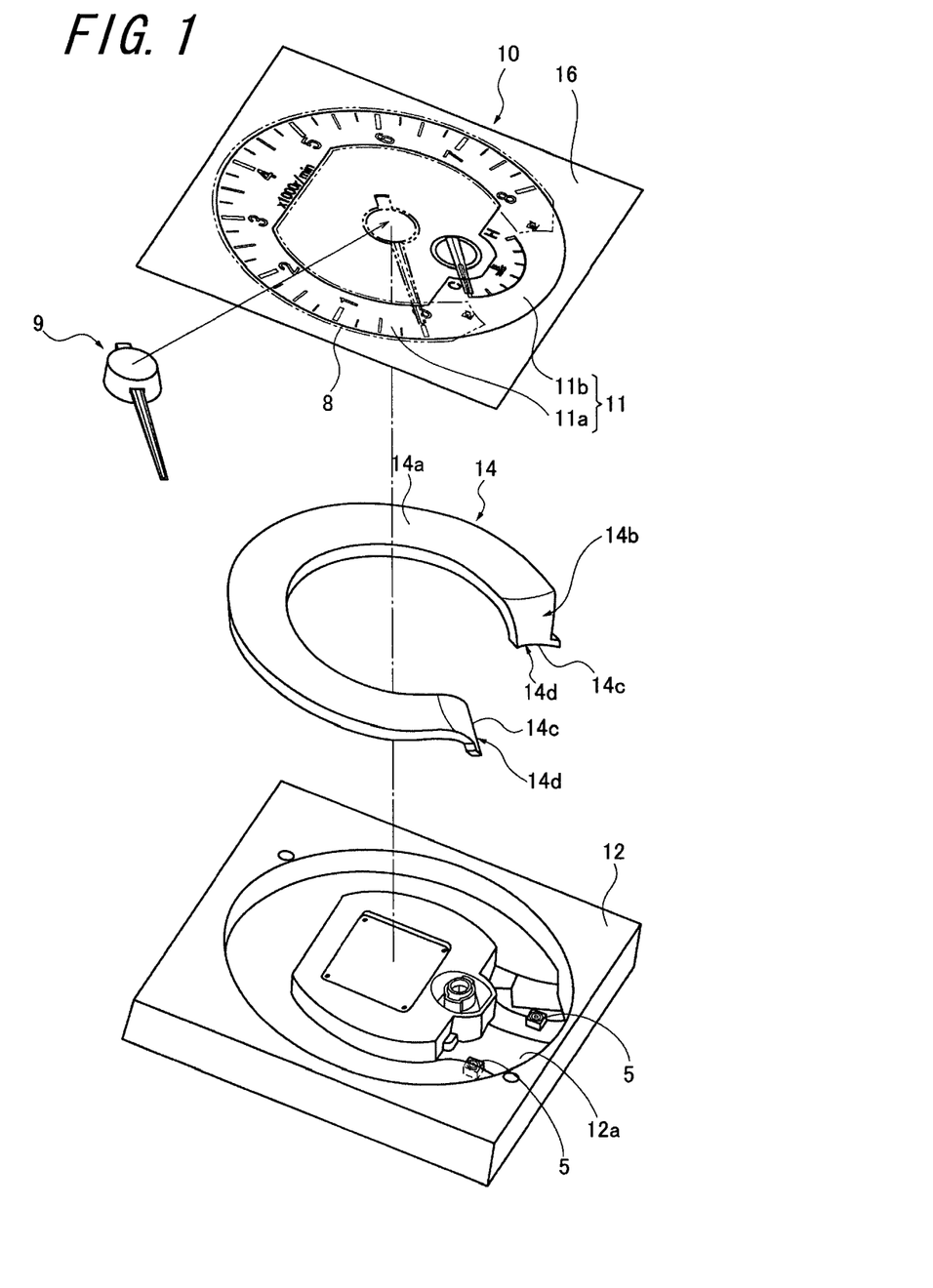
FIG. 1 is an exploded perspective view of an instrument illumination device for a vehicle according to a first embodiment of the present invention, suitable for explaining an overall structure.
Figure 2:
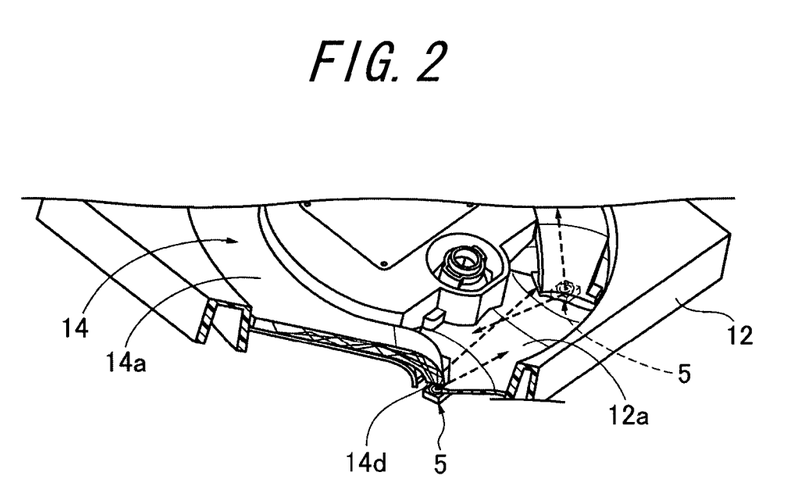
FIG. 2 is an enlarged perspective view, partly in cross-section, of a main section of the instrument illumination device according to the first embodiment.

FIG. 1 to FIG. 6 illustrate the instrument illumination device 10 according to a first embodiment. As illustrated in FIG. 2, a pair of light sources LEDs 5, 5 are provided at the right and left sides of a bottom face 12a in an instrumental housing 12.

Figure 3:
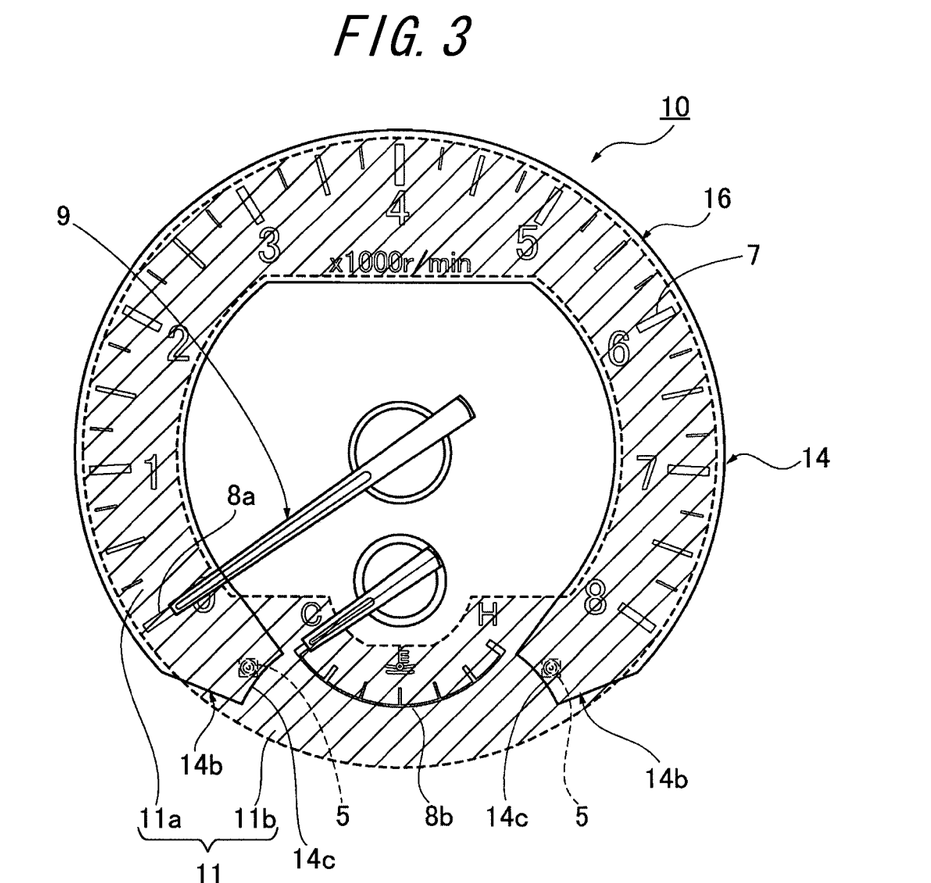
FIG. 3 is an elevation view of a light guide plate of the instrument illumination device having a dial plate mounted thereon according to the first embodiment.

As illustrated in FIG. 3, a dial plate 16 covering a front opening of the instrumental housing 12 has an illumination area 11 including a main illumination area 11a provided with a main dial 8a for displaying the revolution and an auxiliary illumination area 11b provided with an auxiliary dial 8b for displaying a water temperature.

The main illumination area 11a is in the shape of a ring having a cut-out at a lower part thereof.

The auxiliary illumination area 11b fills the cut-out and connects the main illumination area 11a. Accordingly, the main illumination area 11a and the auxiliary illumination area 11b together form the illumination area 11 that may transmit illumination light on an entire area thereof.

Illumination light from the LEDs 5, 5 illuminates the entire area of the illumination area 11 in the ring shape from a rear side thereof, as backlight. A light guide plate 14 is provided between the LED 5 and the dial plate 16 such that the transmitted illumination light looks approximately homogeneous from inside the vehicle without generating heterogeneous illumination light, such as pointed illumination light.

Figure 4:
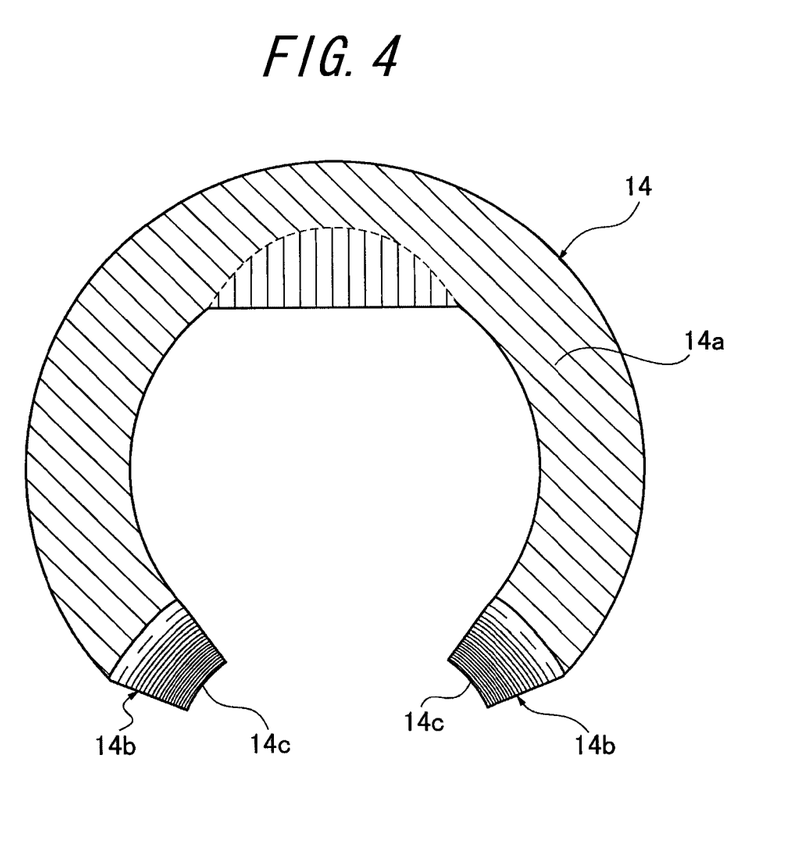
FIG. 4 is an elevation view of the light guide plate of the instrument illumination device according to the first embodiment.

The light guide plate 14 according to the first embodiment is in the approximate shape of a horseshoe in a plane view and mounted in the housing member 12 such that a flat upper surface 14a is opposite to a rear face of the main illumination area 11a in parallel thereto.

Figure 6:
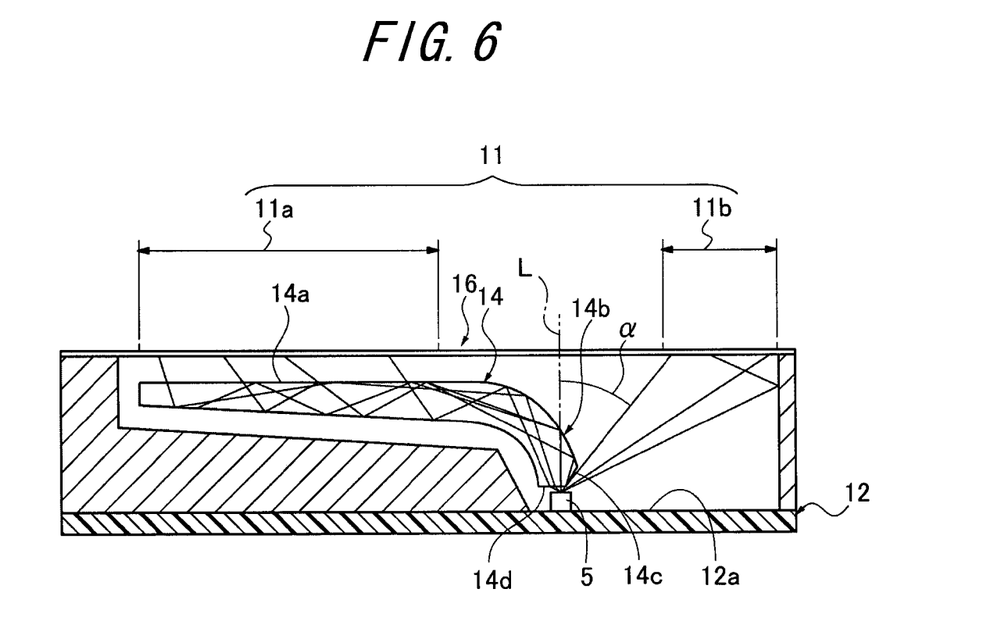
FIG. 6 is a longitudinal-sectional view illustrating the positional relationship between the light guide plate and the light source of the instrument illumination device according to the first embodiment.

As illustrated in FIG. 6, edge portions where the light guide plate 14 is cut out are bent approximately 90 degrees toward the LEDs 5 such that each light source side ends 14b, 14b renders a bottom face 14d opposing the bottom face 12a in parallel thereto.

According to the first embodiment, the light source side end 14b has a cut-out slope 14c of the semi-cylindrical shape. Thereby, the illumination light from the LED 5 around an optical axis L is split into light amount for entering a part of the bottom face 14d and travelling through the light guide plate 14 to illuminate the main illumination area 11a, and a light amount for directly illuminating the auxiliary illumination area 11b of the dial plate 16.

According to the first embodiment, the cut-out slope 14c is formed at a half angle α (here, α is approximately 60 degrees) from a vertical direction along the optical axis L illustrated in FIG. 6 so as to split the light amount into two halves.

Figure 5:
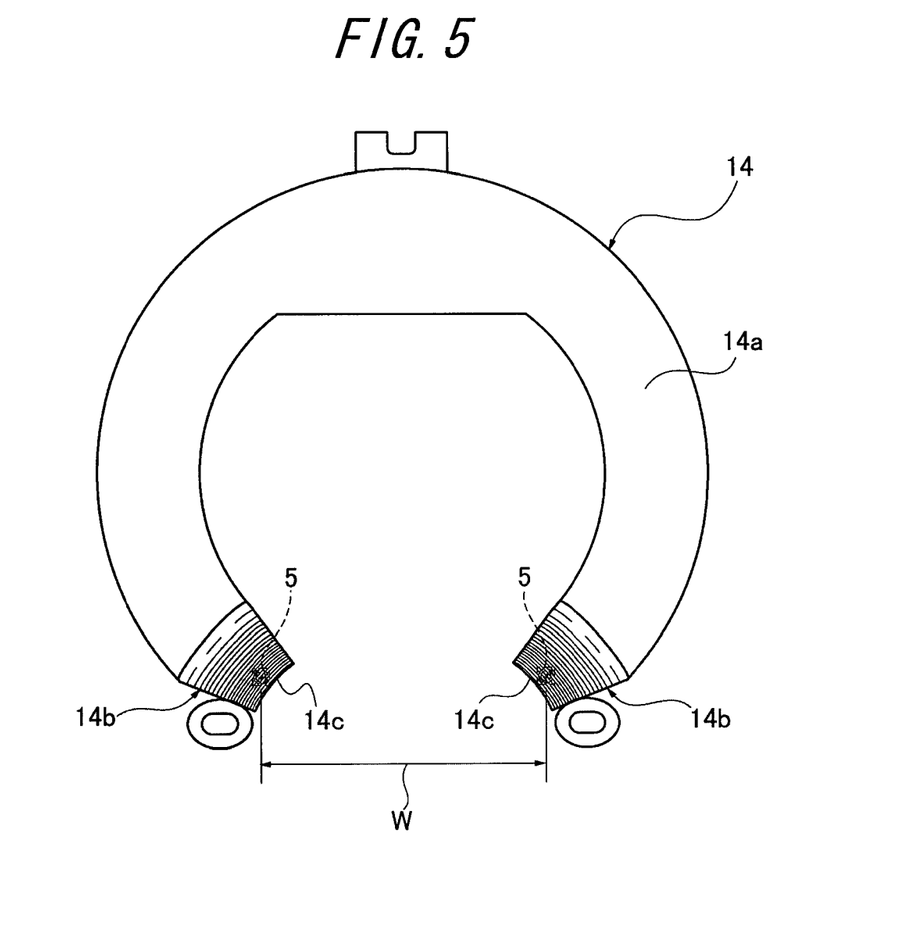
FIG. 5 is an elevation view illustrating a positional relationship between the light guide plate and a light source of the instrument illumination device according to the first embodiment.

According to the first embodiment, furthermore, a gap between the pair of LEDs 5, 5 is set to be W as illustrated in FIG. 5, which is the distance enabling the illumination light in the main illumination area 11a and that in the auxiliary illumination area 11b to overlap with each other for complement where the light amount in each of the areas reduces.

Next, the advantageous effects of the first embodiment will be described.

According to the first embodiment, when the LED 5 is activated, the illumination light centering the optical axis L enters the light guide plate 14 from the bottom face 14d of the light source side end 14b to travel through the light guide plate 14 and illuminate the main illumination area 11a.

Also, since the cut-out slope 14c is formed at the half angle α, which splits the light amount into two halves from the vertical direction along the optical axis L as illustrated in FIG. 6, the illumination light from the LED 5 exceeding the half angle α from the optical axis L is distributed to directly illuminate the auxiliary illumination area 11b of the dial plate 16.

As described above, the illumination light from the LEDs 5, 5 having high directionality is split into two homogeneous lights: the light amount for travelling through the light guide plate 14 and the light amount to be dispersed outside the light guide plate 14, in accordance with an area ratio of the main illumination area 11a and the auxiliary illumination area 11b.

Accordingly, it is possible to ensure that both of the main illumination area 11a and the auxiliary illumination area 11b are homogeneously illuminated by the illumination light.

Also, since the pair of LEDs 5, 5 are disposed having the gap W therebetween enabling complement, the illumination light from the LEDs 5,5 overlap with each other where the light amounts reduce in the main illumination area 11a and the auxiliary illumination area 11b, thereby the homogeneous light may be obtained in a broad area.

Accordingly, the backlight may be obtained in a broad area without the need to increase the number of light sources, thereby enhancing the freedom degree of the ornamental designing process.

Further, since the cut-out slope 14c of the embodiment 1 is formed in a cut-out process, distribution of the light amount may be easily adjusted.

Second Embodiment

Figure 7:
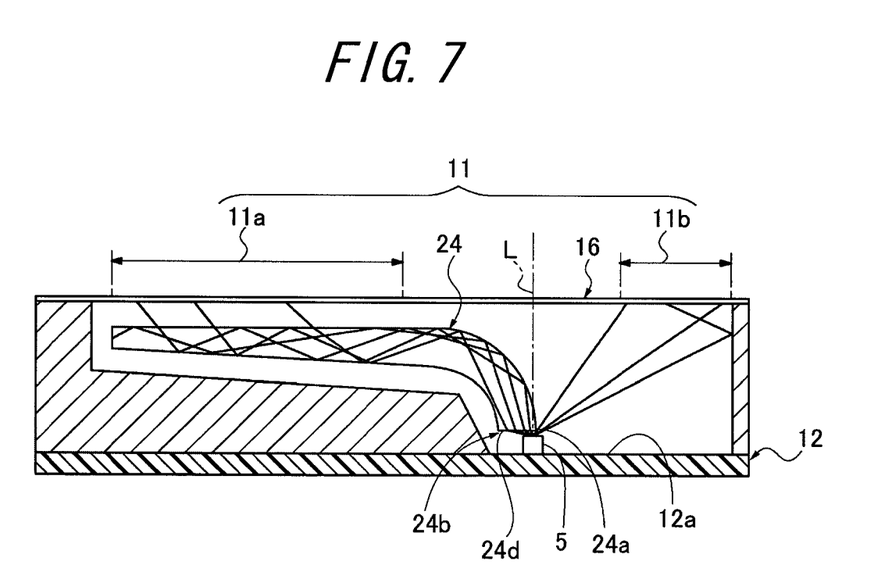
FIG. 7 is a longitudinal-sectional view illustrating the positional relationship between the light guide plate and the light source of the instrument illumination device according to a second embodiment.

FIG. 7 is similar to FIG. 6 explained above, and illustrates an instrument illumination device according to a second embodiment of the present invention.

The components of the second embodiment, which are the same as, or similar to, those of the instrument illumination device according to the first embodiment, are denoted by the same reference numerals.

According to the second embodiment, the light guide plate 24 has a bottom face 24d of a light source side end 24b, which is flat in the whole area and opposite to the bottom face 12a. However, the cut-out slope 14c of the light guide plate 14 according to the first embodiment is not provided.

An end face 24a of the light source side end 14b is disposed immediately above the optical axis L of the LED 5.

Next, the advantageous effects of the second embodiment will be described.

According to the instrument illumination device of the second embodiment, in addition to the effects of the instrument illumination device according to the first embodiment, since the end face 24a is disposed on the optical axis L of the LED 5, at least a part of the light guide side end 14b splits the illumination light into the light amount for entering the light guide plate 24 and the light amount for directly illuminating the auxiliary illumination area 11b of the dial plate 16.

Other configurations and effects are the same, or similar to, those of the first embodiment and thus superfluous description is omitted for the sake of clarity.

Although the preferred embodiments of the present invention have been described above in detail with reference to the drawings, the instrument illumination device according to the present invention is not limited to the specific configuration of the above embodiments and various changes may be made within the scope of the present invention as being encompassed thereby.

For example, although the cut-out slope 14c according to the instrument illumination device of the above embodiments is formed at the half angle α (here, α is approximately 60 degrees) from the vertical direction along the optical axis L as illustrated in FIG. 6 such that the illumination light is split into two halves, the angle is not limited thereto. Also, the shape, the number and the materials of the light source side ends 14b, 24b and the cut-out slope 14c are not specifically limited, so long as the illumination light is homogeneously split in accordance with the area ratio of the main illumination area 11a and the auxiliary illumination area 11b.

Although the instrument illumination devices according to the above embodiments are described as applicable to vehicle indicators installed in a vehicle interior, the instrument illumination device is not limited to such specific application, but may also be used for other display devices of a vehicle, or for a backlight of a liquid crystal display.

REFERENCE NUMERALS

5 Light source (LEDs)
10 Instrument illumination device
11 Illumination area
11a Main illumination area
11b Auxiliary illumination area
14, 24 Light guide plate
14b, 24b Light source side end
14d, 24d Bottom face

What is claimed is:

1. An instrument illumination device comprising a light source disposed in an instrument housing, a dial plate that covers the instrument housing and uses illumination light from the light source as a backlight, and a light guide plate disposed between the light source and the dial plate, the instrument illumination device being provided with a main illumination area using the backlight traveling through the light guide plate for a main display of the dial plate and an auxiliary illumination area that is not opposite to the light guide plate, wherein the light guide plate comprises means for splitting the illumination light from the light source into a light amount for travelling inside the light guide plate and another light amount to be externally dispersed, in accordance with an area ratio of the main illumination area and the auxiliary illumination area.

* * * * *